United States Patent Office 3,456,803
Patented July 22, 1969

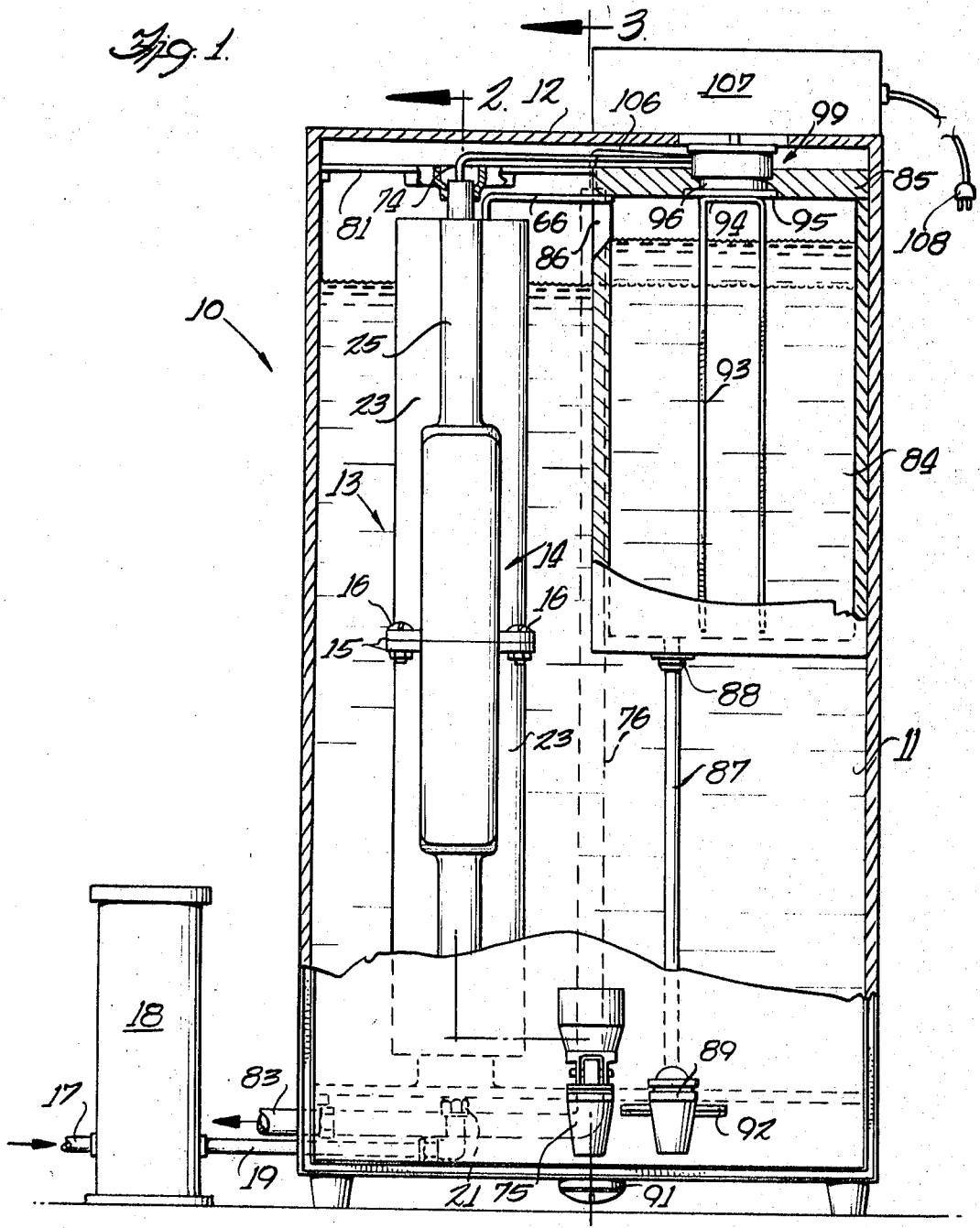

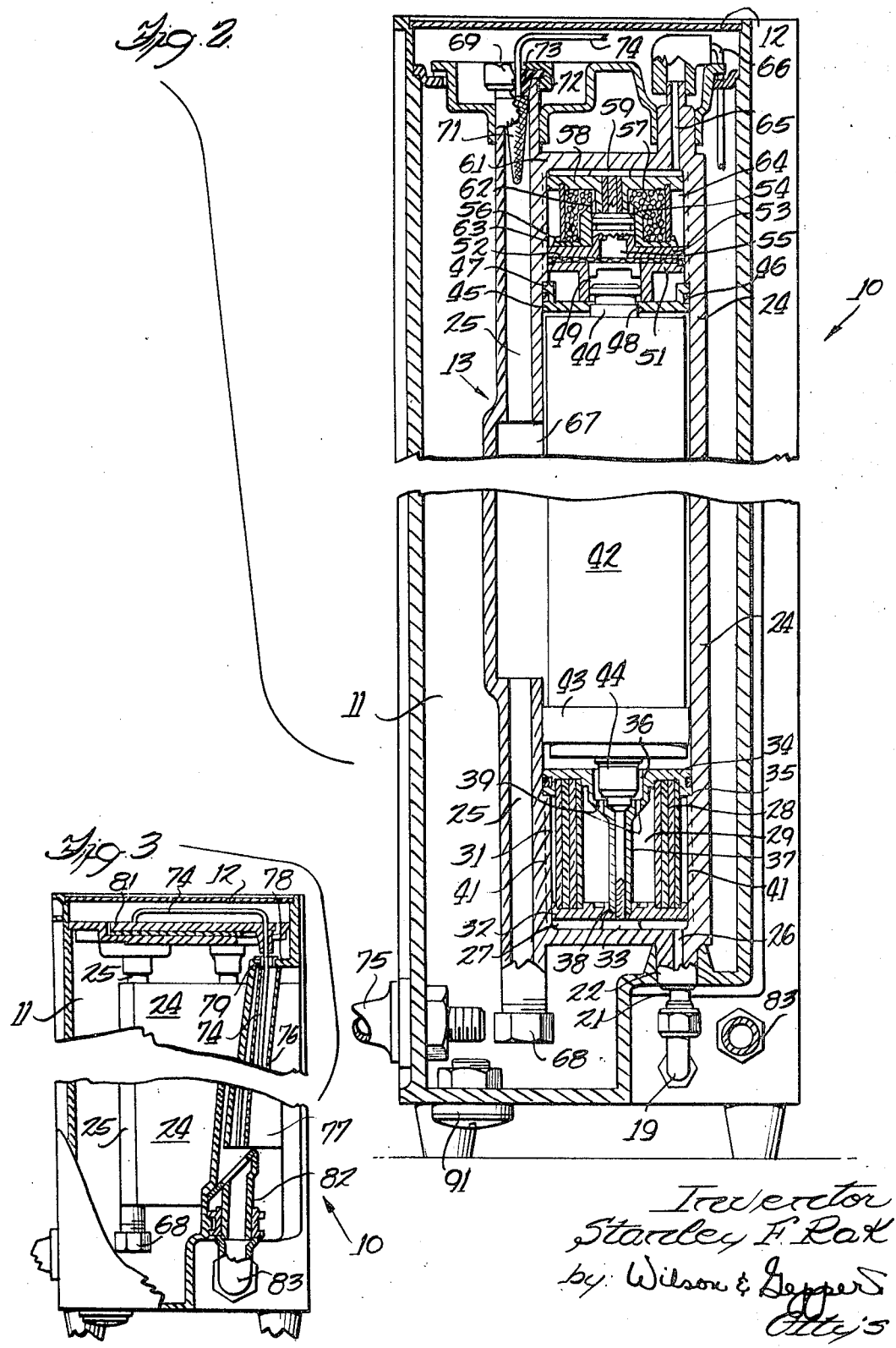

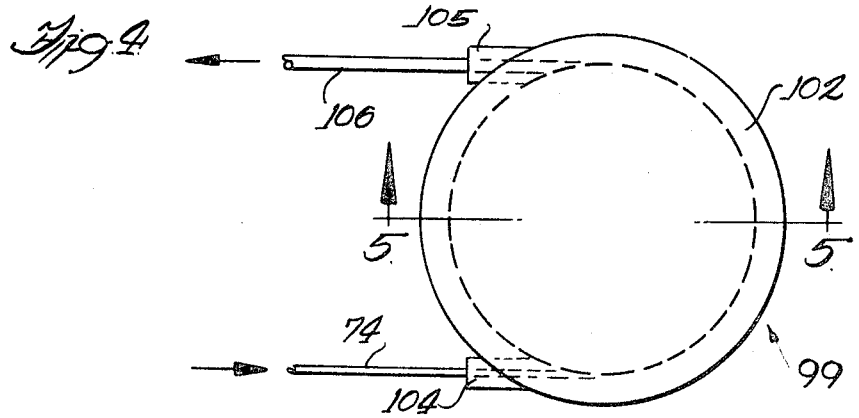
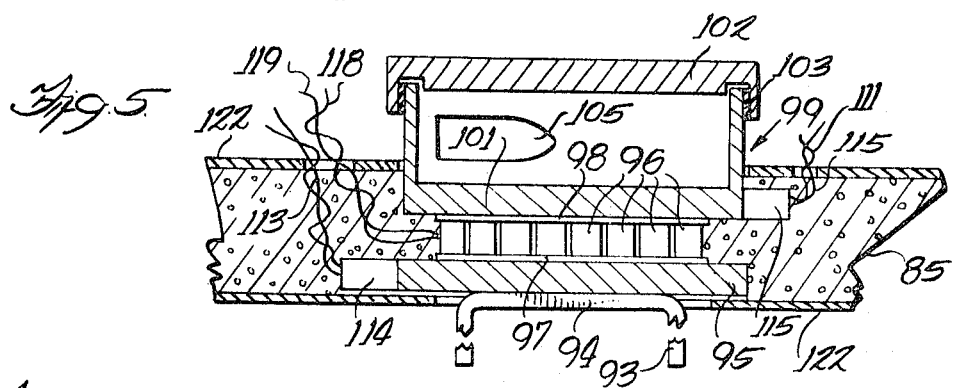
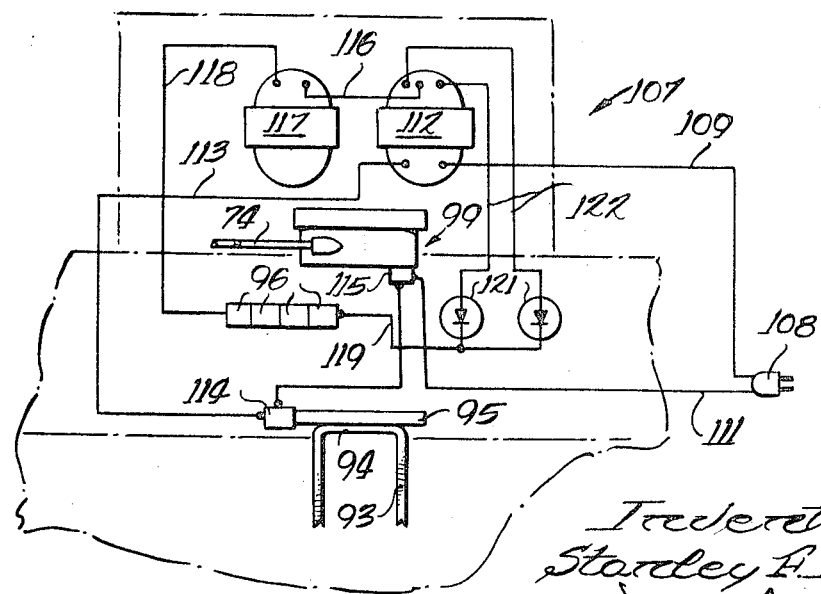

3,456,803
DRINKING WATER TREATMENT APPARATUS
Stanley F. Rak, Mundelein, Ill., assignor to Culligan, Inc., Northbrook, Ill., a corporation of Delaware
Filed Feb. 9, 1967, Ser. No. 614,954
Int. Cl. B01d 13/00, 35/18; C02b 1/02
U.S. Cl. 210—177   5 Claims

ABSTRACT OF THE DISCLOSURE

A water treating apparatus for filtering and treating impure water to provide by a reverse osmosis operation, a supply of pure water for drinking and cooking and a stream of concentrated impure water passing to a drain. A thermoelectric cooling element cools a portion of the pure water with the thermoelectric module being cooled by the stream of concentrated impure water from the reverse osmosis module.

---

The present invention relates to a water conditioning or treating apparatus and more particularly to a water conditioner apparatus utilizing a conditioning or purifying cartridge to provide pure and substantially deionized water for drinking and cooking in the home or other suitable location.

Among the objects of the present invention is the provision of a water conditioning apparatus which will continuously treat and store the purified treated water for any intended use in the home or other location. The apparatus includes a purified water reservoir within which is positioned one or more water treatment cartridges which will provide, from impure water, both purified water and concentrated impure water with the purified water from the cartridge entering the reservoir and the concentrated impure water passing to a suitable drain or standpipe at the exterior of the reservoir.

Another object of the present invention is the provision of a water conditioner apparatus having a water purifier cartridge or module preceded by a prefilter to initially filter out any suspended impurities, and an activated charcoal filter element positioned on or associated with the purified water outlet to remove any taste or odor in the purified water not removed in the previous treatment. The water purifier cartridge utilizes an osmotic membrane with a reverse osmotic action to separate impure water into a purified stream and a concentrated impure stream.

A further object of the present invention is the provision of a water conditioning apparatus having a water purifying cartridge provided with a purified water outlet and a concentrated impure water outlet; the impure water outlet providing a back pressure for the cartridge to assist in the reverse osmosis action. The back pressure is provided at the concentrated impure water outlet through the use of a filter screen and outlet connector assembly having a small diameter tube or conduit to restrict the flow of liquid which extends from the connector to and drains in the standpipe.

The present invention also comprehends the provision of a water conditioning apparatus having a primary reservoir storing the treated purified water and a second reservoir mounted within the primary reservoir for the cooling and storage of purified water to be dispensed from a separate faucet as cold water for drinking. The water in the primary reservoir is then used for cooking or other uses not requiring the water to be chilled. The second reservoir is formed of a thermal insulation material to reduce the heat transfer between the two reservoirs.

The present invention further comprehends the provision of a water conditioning or treating apparatus having a chilled water reservoir where the water is chilled by a thermoelectric cooler. The thermoelectric cooler includes a heat conductor extending into the reservoir and into the purified water therein. A thermoelectric module is mounted in the top of the reservoir sandwiched between a heat sink contacting the heat conductor and a heat exchanger which functions to draw heat away from the hot side of the module and thus cool the module. The heat exchanger employs the concentrated waste stream emanating from the water purifier cartridge prior to draining into a standpipe.

Further objects are to provide a construction of maximum simplicity, efficiency, economy and ease of assembly and operation, and such further objects, advantages and capabilities as will later more fully appear and are inherently possessed thereby.

In the drawing:

FIGURE 1 is a front elevational view with a portion of the cover and reservoir broken away to show the water conditioner assembly of the present invention with a single purifying cartridge and a thermoelectric water cooler.

FIG. 2 is an enlarged fragmentary vertical cross sectional view of the water conditioner assembly taken on the irregular line 2—2 of FIG. 1 and showing the prefilter and charcoal filters on the purifier cartridge and the lines for the purified water and concentrated impure water going to the reservoir and drain as normally occurring where the thermoelectric cooler is not present.

FIG. 3 is a vertical cross sectional view of the apparatus taken on the line 3—3 of FIG. 1 showing the normal connection of the concentrated impure water line to the drain standpipe where the thermoelectric cooler is omitted.

FIG. 4 is a top plan view of a heat exchanger utilized in the thermoelectric cooler as shown in FIG. 1.

FIG. 5 is a vertical cross sectional view of the heat exchanger taken on the line 5—5 of FIG. 4 as well as showing the thermoelectric module and heat conducting members in the top wall of the chilled water reservoir.

FIG. 6 is a schematic showing of the electrical circuit for the thermoelectric module.

Referring more particularly to the disclosure in the drawings where in is shown an illustrative embodiment of the present invention FIG. 1 discloses a water conditioning and purifying apparatus 10 having a primary purified water reservoir 11 enclosed in a cover 12. The reservoir 11 receives one or two water purifier cartridge units 13 (only one cartridge unit being shown), each unit having a two-part cartridge casing 14 which is joined at the center by flanges 15 retained together by suitable securing means such as the nuts and bolts 16; a sealing gasket (not shown) being provided between the flanges.

A source of raw impure water 17 to be treated and containing undesirable dissolved or undissolved solids passes through a suitable chemical feeder 18 supplying sufficient chemical to the water to control the pH thereof to an optimum level of approximately 5.0; because above and below this level the useful life of the membrane decreases. Thus, chemical treatment of the water, normally with an acidulent, modifies the pH thereof to a level which will yield an extended useful membrane life. The pretreatment feeder can also be used for feeding chemicals such as biological growth inhibitors or other chemicals which will alter the membrane environment to render it less destructive to the reverse osmosis membrane. The water passes through the conduit 19 from the feeder 18 to an inlet 21 connected to inlet fitting 22 (FIG. 2) of the casing 14.

The casing 14 is formed of two substantially identical parts or sections 23, 23, each having a generally cylindrical portion 24 with an axially offset passage 25 opening into the cylindrical portion 24 adjacent the flange 15 (FIG. 2). An axially offset inlet port 26 in the fitting 22 opens into a chamber 27 at the lower end of the cylindrical portion 24. Located within the chamber 27 of the casing is a cylindrical filter 28 having a central hollow passage or chamber 29; the filter being spaced from the interior wall of the chamber 27 to provide an annular chamber or space 31 therearound.

The filter 28 is positioned between a filter support 32 resting on a central projection 33 in the bottom of chamber 27 and an upper plate 34 having an O-ring seal and resting on a shoulder 35 formed in the casing 14. The upper plate 34 has a central recess 36 for one end of a module to be later described with a central depending projection 37 extending down to and received in a recess 38 in the support 32. The upper recess 36 includes one or more passages 39 communicating with the chamber 29 within the filter 28. The chamber 27 is further provided with arcuately spaced ribs 41 in the side wall thereof forming spaced passages communicating between the annular chamber 31 and the inlet port 26 around the filter support 32.

Within the elongated cylindrical portion 24 of the casing 14 is a reverse osmosis membrane module 42 having a lower seal 43 in the lower portion 23; which module includes a central module stem 44 extending from the module into the recess 36. The opposite end of the stem 44 extends through a central opening in an upper support plate 45 which is sealed in the upper portion 23 by O-ring 46. The support plate 45 is also positioned against a shoulder 47 in the upper portion 23, and a shoulder 48 on the stem 44 cooperates with a complementary shoulder in the plate 45.

The stem 44 extends into and terminates in an opening 49 in a lower membrane support 51 for a microporous membrane 52 utilized for the filtering of bacteria present in the water. An upper membrane support 53 has a central projection 54 containing a central passage 55 which extends into a recess in a lower filter support 56 for a charcoal filtering medium 57. An upper filter support 58 abuts a central projection 59 on the end wall 61 of the upper portion 23. A plurality of passages 62 are located in the lower filter support 56, and the wall of the portion 23 is provided with axially extending ribs 63 forming the shoulder 47 and also forming passages from an annular space 64 formed at the exterior of the charcoal filter 57 around the upper support 58 to a space formed between the support 58 and the end wall 61. An axially offset outlet passage 65 communicates with the last mentioned space to a fitting for the outlet conduit 66.

The reverse osmosis module 42 consists of a spirally wound-permeable membrane, such as shown in the Westmoreland Patent No. 3,367,504, the Bray Patents No. 3,367,505 or the Merten Patent No. 3,390,773, which permits the solvent phase of a solution to flow through it at a higher rate than the solute when an applied pressure differential is in excess of the osmotic pressure differential of the solution. The purified water or solvent in the module flows to and into the outlet tube or stem 44 leading to the opening 49 in the lower membrane support 51, through the microporous membrane 52 and the charcoal filter 57, around the upper filter support 58 and out the outlet passage 65 to the conduit 66. The impure water which is not purified becomes more concentrated in mineral content and passes longitudinally outward through the module 42 to the exterior thereof and enters the offset longitudinal passage 25 extending along the exterior of the casing 14 through an opening 67 formed intermediate the ends of the joined cylindrical portions 24.

The lower end of passage 25 in lower portion 24 is plugged or capped by the cap 68, and the upper end of passage 25 in upper portion 24 is capped with a cap 69 forming an adapter for a small diameter flow restricting drain tube 74. A generally conical screen 71 is positioned in the passage 25 by a resilient plug 72 thereabove having a central passage 73 to receive the end of the flow restricting tube 74. The small diameter tubing may be formed of plastic or stainless steel; however, if the water contains iron, a stainless steel tube is preferred as the water containing the iron tends to coat and clog a plastic small diameter tubing with precipitated iron.

Water enters the apparatus under a suitable pressure and at a preferred pH level. The control of the pH range has been found necessary, as previously stated, to reduce the cellulose acetate hydrolysis rate of the reverse osmosis membrane which tends to prolong the life of the membrane. As the reverse osmosis operation occurs only when the applied pressure is in excess of the osmotic pressure of the solution, the small diameter tubing 74 provides a sufficient flow restriction so that the quantity of impure concentrate is regulated and also that the pressure exerted by the incoming impure water is preserved to promote the reverse osmosis action in the module.

As long as the module is operative and imperforate, no bacteria present in the impure water can pass through the membrane to be present in the purified water stream, however, the microporous membrane or filter 52 is positioned to stop any bacteria coming out of the reverse osmosis module 42; the bacteria stopping the flow of water by plugging the filter 52. When the filter 52 is completely plugged with bacteria, all flow of water is stopped through the filter indicating malfunction of the module, and the module and the filter must be removed and replaced to again allow flow of water through the module free of contaminants. The purified bacteria-free water passes through the charcoal filter 57 to remove any remaining taste or odor from the water prior to filling the reservoir 11. The consumer obtains the purified water when required by means of the faucet or spigot 75. A drain standpipe 76 is provided at the rear of the reservoir 11 into which the drain tubing 74 extends.

As more clearly seen in FIG. 3, the drain standpipe 76 is formed in a central vertically arranged recess 77 in the rear wall of the reservoir 11, the recess having a top wall or weir 78 with an opening 79 providing an overflow connection for the reservoir leading to the standpipe. The small diameter tubing 74 would normally extend through an opening in the top wall 81 closing the reservoir 11 into the standpipe. A drain fitting 82 receiving flow from the standpipe 76 terminating thereabove leads to a drain pipe 83 from the apparatus 10. Also, the purified water conduit 66 normally extends downward through the wall 81 into the reservoir 11 to terminate adjacent the bottom thereof (see FIG. 2).

As seen in FIG. 1, an additional reservoir 84 can be removably secured within the main reservoir 11 in the position which normally is utilized for a second reverse osmosis cartridge unit 13. This reservoir 84 is preferably formed of a thermal insulating material such as styrofoam or polyurethane foam and is cemented to a cover 85 therefor. The reservoir 84 and cover 85 can be bolted to the top wall 81 for the reservoir or cemented thereto. The reservoir 84 includes an opening 86 receiving the end of the purified water conduit 66 and also forming an overflow opening for the reservoir, so that the cold water reservoir 84 is initially filled and then the overflow fills the main reservoir 11.

A cold water outlet conduit 87 extends from a suitable fitting 88 in the bottom of the reservoir 84 to a second faucet of spigot 89 mounted either in the front wall of the reservoir 11 as shown or mounted in the plugged fitting 91 in the bottom of the reservoir (see FIGS. 1 and 2); the faucet 89 preferably utilizing a lift plate 92 to actuate the valve therein. The opening 86 is located in the upper rear section of the reservoir 84 and the fitting 88 is located at the lower front portion of the reservoir 11 to permit mount of the unit 10 in either the horizontal or vertical position. When in a horizontal position, the cold water faucet 89 would be mounted in the position of the ambient water spigot 75 and vice versa.

Within the reservoir 84 (FIGS. 1 and 5), a generally U-shaped heat conductor 93 is mounted at its connecting portion 94 to a heat sink 95 embedded in the foam plastic forming the cover 85. The heat conductor 93 is formed of a high heat conducting material, such as copper or aluminum, and the legs extend downwardly to adjacent the bottom of the reservoir 84. The heat sink 95 is also formed of a high heat conductive material, such as copper, and abuts one side of a plurality of thermoelectric modules 96 connected in series and having a hot side 98 and a cold side 97 abutting the heat sink 95. The hot side 98 abuts the heat conductive housing 101 of the heat exchanger 99.

As is well known in the art, a thermoelectric module as used herein comprises a junction of dissimilar thermoelectric elements commonly known as "N" and "P" materials. A current flowing from an "N" material to a "P" material causes heat to be absorbed at the junction of the elements; while conversely current flowing in the opposite direction from a "P" material to an "N" material causes heat to be dissipated at the junction.

The heat exchanger 99 has a cover 102 suitably sealed onto the housing 101 by a ring sealing means or gasket 103 and has a tangential inlet 104 (FIG. 4) connected to and receiving the drain tubing 74 from the reverse osmosis module 42 and a tangential outlet 105 on the opposite side (FIGS. 4 and 5) with tubing 106 leading from the outlet to the drain standpipe 76 (FIG. 1). Mounted directly above the heat exchanger 99 on the reservoir 11 as close as possible to the heat exchanger is a power supply 107 which is shown schematically in FIG. 6.

A plug 108 connects to a source of A.C. power with the leads 109, 111 extending into the power supply 107 for the thermoelectric module. Lead 109 is connected to the primary winding of transformer 112 with a lead line 113 from the primary winding of the transformer to a low temperature cut-off switch 114. In series with switch 114, which is located adjacent the heat sink 95, is a high temperature cut-off switch 115 located adjacent the heat exchanger 99 and connected to the other lead 111 from the plug 108. Both the high temperature and low temperature cut-off switches 115 and 114, respectively, are utilized to disconnect the power to the transformer 112 in the event of either excessive temperature occuring at the heat exchanger for reasons such as failure of concentrate water flow or before an icing condition is encountered at the heat sink.

The center tapped secondary winding of the transformer 112 is connected through a lead 116 to a filter choke 117 which is, in turn, connected by lead 118 to the thermoelectric modules 96. The modules 96 are connected by lead 119 to rectifier diodes 121, with leads 122 from the diodes 121 to the secondary winding of the transformer 112. This arrangement provides DC power for the thermoelectric modules. As the transformer 112, choke 117 and diodes 121 are closely adjacent the top of the heat exchanger 99, they are also cooled thereby.

In operation, the concentrate water from the drain tubing 74 flows through the heat exchanger 99 to draw heat from and cool the hot side 98 of the thermoelectric modules 96. As current is flowing through the modules, the temperature differential is maintained causing a decrease in the temperature of the cold side 97 of the modules which results in a drawing or extracting of the heat from the water in the reservoir 84 through the heat conductor 93 and heat sink 95. The entire reservoir 84 and cover 85 can be bounded on both sides by a medically safe rigid material 123 to retain the purity of the water therein and in the main reservoir 11.

Both the ambient water spigot 75 and the cold water faucet 89 are of commercially available design; the faucet 89 having the lift plate 92 actuating a valve within the faucet to dispense cold water. While a treating and dispensing unit is described by way of illustration, it is not my intent or desire to unnecessarily restrict the improvement by virtue of this limited showing.

Having thus disclosed my invention, I claim:

1. A water conditioning apparatus to provide purified water from an impure water supply, comprising a reservoir for the purified water, at least one cartridge mounted within the reservoir, said cartridge including a pair of casing halves joined together, each half having a cylindrical portion with an open end and a closed end and an axially offset longitudinally extending drain passage having open and closed ends and communicating with the cylindrical portion adjacent the open end thereof, a water purification module in said cartridge for separating purified water from the impure water supply by reverse osmosis, an impure supply water inlet at one end of said cartridge communicating with one end of said reverse osmosis module, a purified water outlet in the opposite end of the cartridge communicating with the opposite end of the reverse osmosis module, said reverse osmosis module purifying a portion of the impure water supply and also providing more concentrated impure water, a small diameter tube communicating with an end of the offset drain passage restricting flow of concentrated impure water therethrough, a first filter in said cartridge between said inlet and said module, a second charcoal filter between said module and said purified water outlet, a spigot on said reservoir adjacent the bottom thereof, and a drain standpipe in a recess at the exterior of said reservoir, said reservoir having an overflow opening communicating with said standpipe, and said flow restricting tube communicating with and emptying into said standpipe.

2. A water conditioning apparatus, as set forth in claim 1, including a microporous membrane positioned between the purified outlet end of the reverse osmosis module and said second filter to filter out any bacteria present in the water.

3. A water conditioning apparatus as set forth in claim 1, including a chemical feeder communicating with the impure water supply inlet prior to the cartridge and feeding suitable chemicals into the impure water to adjust the pH thereof.

4. A water conditioning apparatus as set forth in claim 1, including a cold water reservoir removably mounted within said first mentioned reservoir, said cold water reservoir having an overflow opening therein and an outlet, a second spigot communicating with said cold water outlet, said purified water outlet of said cartridge communicating with said cold water reservoir, a heat conductor extending into the water in said cold water reservoir, a plurality of thermoelectric modules drawing heat from said heat conductor, a heat sink interposed between said heat conductor and said thermoelectric modules, and a heat exchange drawing the heat from the hot side of said thermoelectric modules.

5. A water conditioning apparatus as set forth in claim 4, in which said heat exchanger has an inlet and an outlet, said flow restricting tube from said impure water outlet of the cartridge communicating with said heat exchanger inlet, and said heat exchanger outlet communicating with said drain standpipe.

(References on following page)

References Cited

UNITED STATES PATENTS

| | | | |
|---|---|---|---|
| 1,580,300 | 4/1926 | Howorth | 210—175 X |
| 1,825,631 | 9/1931 | Horrath | 210—129 X |
| 2,019,094 | 10/1935 | Rice et al. | 210—445 |
| 2,275,750 | 3/1942 | Genetti et al. | 210—70 X |
| 2,998,162 | 8/1961 | Varnell | 222—146 X |
| 3,176,472 | 4/1965 | Cox | 62—3 |
| 3,123,980 | 3/1964 | Steimel | 62—3 |
| 3,250,433 | 5/1966 | Christine et al. | 62—3 X |
| 3,365,061 | 1/1968 | Bray | 210—321 X |
| 3,390,773 | 7/1968 | Merten | 210—125 |

REUBEN FRIEDMAN, Primary Examiner

T. A. GRANGER, Assistant Examiner

U.S. Cl. X.R.

210—182, 199, 202, 331; 222—146